(12) United States Patent
Hira et al.

(10) Patent No.: US 11,777,853 B2
(45) Date of Patent: Oct. 3, 2023

(54) CONGESTION-AWARE LOAD BALANCING IN DATA CENTER NETWORKS

(71) Applicant: Nicira, Inc., Palo Alto, CA (US)

(72) Inventors: Mukesh Hira, Palo Alto, CA (US); Naga Katta, San Francisco, CA (US)

(73) Assignee: NICIRA, INC., Palo Alto, CA (US)

( * ) Notice: Subject to any disclaimer, the term of this patent is extended or adjusted under 35 U.S.C. 154(b) by 111 days.

(21) Appl. No.: 15/485,139

(22) Filed: Apr. 11, 2017

(65) Prior Publication Data

US 2017/0295101 A1  Oct. 12, 2017

Related U.S. Application Data

(60) Provisional application No. 62/321,725, filed on Apr. 12, 2016.

(51) Int. Cl.
*H04L 47/125* (2022.01)
*H04L 47/11* (2022.01)
(Continued)

(52) U.S. Cl.
CPC ........ *H04L 47/125* (2013.01); *H04L 41/0896* (2013.01); *H04L 43/0876* (2013.01);
(Continued)

(58) Field of Classification Search
None
See application file for complete search history.

(56) References Cited

U.S. PATENT DOCUMENTS 6,711,152 B1 * 3/2004 Kalmanek, Jr. ......... H04L 45/04
370/351
7,068,667 B2 6/2006 Foster et al.
(Continued)

FOREIGN PATENT DOCUMENTS

GB  2493710 A  2/2013

OTHER PUBLICATIONS

Mohammad Alizadeh et al: "CONGA",SIGCOMM, ACM, 2 Penn Plaza, Suite 701 New York NY 10121-0701 USA, Aug. 17, 2014 (Aug. 17, 2014), pp. 503-514, XP058053862,DOI: 10.1145/2619239. 26263161SBN: 978-1-4503-2836-4 (Year: 2014).*
(Continued)

*Primary Examiner* — Joseph A Bednash
(74) *Attorney, Agent, or Firm* — SU IP CONSULTING (57) ABSTRACT

Example methods are provided for a first switch to perform congestion-aware load balancing in a data center network. The method may comprise: receiving probe packets from multiple next-hop second switches that connect the first switch with a third switch via multiple paths. The method may also comprise: processing congestion state information in each probe packet to select a selected next-hop second switch from the multiple next-hop second switches, the selected next-hop second switch being associated with a least congested path from the first switch to the third switch. The method may further comprise: in response to receiving data packets from a fourth switch that are destined for a destination connected with the third switch, sending the data packets to the selected next-hop second switch such that the data packets travel to the third switch along the least congested path.

10 Claims, 6 Drawing Sheets

(51) Int. Cl.
  *H04L 45/12* (2022.01)
  *H04L 43/0876* (2022.01)
  *H04L 41/0896* (2022.01)
  *H04L 43/10* (2022.01)

(52) U.S. Cl.
  CPC .......... *H04L 43/10* (2013.01); *H04L 45/123* (2013.01); *H04L 47/115* (2013.01)

(56) References Cited

U.S. PATENT DOCUMENTS

| | | | |
|---|---|---|---|
| 8,671,176 | B1 | 3/2014 | Kharitonov et al. |
| 10,771,380 | B2 | 9/2020 | Hira et al. |
| 2002/0145981 | A1 | 10/2002 | Klinker et al. |
| 2002/0150229 | A1* | 10/2002 | Riihinen .......... H04L 47/10 379/221.01 |
| 2007/0283024 | A1 | 12/2007 | Landrum et al. |
| 2011/0302346 | A1* | 12/2011 | Vahdat .......... H04L 49/40 710/301 |
| 2013/0100816 | A1 | 4/2013 | Bergamasco et al. |
| 2014/0047252 | A1* | 2/2014 | Ansari .......... G06F 1/26 713/320 |
| 2016/0269482 | A1 | 9/2016 | Jamjoom et al. |
| 2016/0277953 | A1 | 9/2016 | Andersson et al. |
| 2017/0295100 | A1 | 10/2017 | Hira et al. |
| 2018/0131617 | A1 | 5/2018 | Hira |
| 2019/0058649 | A1 | 2/2019 | Qi et al. |
| 2019/0104075 | A1 | 4/2019 | Li et al. |
| 2020/0195553 | A1 | 6/2020 | Yigit et al. |
| 2020/0220793 | A1 | 7/2020 | Hira |
| 2020/0267059 | A1 | 8/2020 | Mozumdar et al. |
| 2021/0006488 | A1 | 1/2021 | Kikkawa et al. |

OTHER PUBLICATIONS

Mahalingam et al. "Virtual extensible Local Area Network (VXLAN): A Framework for Overlaying Virtualized Layer 2 Networks over Layer 3 Networks". IETF RFC 7348, Aug. 2014 (Year: 2014).*
Farrington et al., "Data Center Switch Architecture in the Age of Merchant Silicon", 17th IEEE Symposium on High Performance Interconnects, 2009 (Year: 2009).*
Alizadeh et al., "CONGA: distributed congestion aware load balancing for data center networks", SIGCOMM '14, Proceedings of the 2014 ACM conference on SIGCOMM, pp. 503-514, Chicago Illinois, USA—Aug. 17-22, 2014, ACM New York, NY, USA (c) 2014 (Year: 2014).*
Nanxi Kang et al., "Optimizing the "One Big Switch" Abstraction in Software-Defined Networks", CoNEXT'13, Dec. 9-12, 2013, ACM.
Mohammad Alizadeh et al., "On the Data Path Performance of Leaf-Spine Datacenter Fabrics", IEEE 21st Annual Symposium on High-Performance Interconnects, 2013, pp. 71-74.
Jonathan Perry et al., "Fastpass: A Centralized "Zero-Queue" Datacenter Network", SIGCOMM, 2014, pp. 307-318, ACM.
Vimalkumar Jeyakumar et al., "EyeQ: Practical Netowk Performance Isolation at the Edge", 10th USENIX Symposium on Networked System Design and Implementation (NSDI'13), 2013, pp. 297-311, USENIX Association.
Lucian Popa et al., "FairCloud: Sharing the Network in Cloud Computing", HotNets-X, (New York, NY, USA), pp. 22:1-22:6, ACM, 2011.
Mohammad Alizadeh et al., "pFabric: Minimal Near-Optimal Datacenter Transport", SIGCOMM'13, Aug. 12-16, 2013, ACM.
Mosharaf Chowdhury et al., "Efficient Coflow Scheduling with Varys", SIGCOMM'14, Aug. 17-22, 2014, ACM.
Mohammad Al-Fares et al., "Hedera: Dynamic Flow Scheduling for Data Center Networks", NSDI 2010, (Berkeley, CA, USA), pp. 19-19, USENIX Association.
Theophilus Benson et al., "MiceroTE: Fine Grained Traffic Engineering for Data Centers", CoNEXT 2011, Dec. 6-9, 2011, ACM.
Jiaxin Cao et al, "Per-packet Load-balanced, Low-Latency Routing for Clos-based Data Center Networks", CoNEXT' 13, Dec. 9-12, 2013, pp. 49-60, ACM.
Srikanth Kandula et al., "Dynamic Load Balancing Without Packet Reordering", ACM SIGCOMM Computer Communication Review, Apr. 2007, pp. 53-62, No. 2, vol. 37.
Siddhartha Sen et al, "Scalable, Opimal Flow Routing in Datacenters via Local Link Balancing", CoNEXT'13, Dec. 9-12, 2013, ACM.
Mohammad Alizadeh et al., "CONGA: Distributed Congestion-Aware Load Balancing for Datacenters", SIGCOMM'14, Aug. 17-22, 2014, ACM.
Chi-Yao Hong et al., "Achieving High Utilization with Software-Driven WAN", SIGCOMM'13, Aug. 12-16, 2013, pp. 15-26, ACM.
Sushant Jain et al., "B4: Experience with a Globally-Deployed Software Defined WAN", SIGCOMM'13, Aug. 12-16, 2013, ACM.
Pat Bosshart et al., "Forwarding Metamorphosis: Fast Programmable Match-Action Processing in Hardware for SDN", SIGCOMM'13, Aug. 12-16, 2013, ACM.
International Search Report and Written Opinion of the International Searching Authority, International application No. PCT/US2017/027190, dated Jun. 9, 2017.
"Cavium and XPliant Introduce a Fully Programmable Switch Silicon Family Scaling to 3.2 Terabits per Second", News & Evnet, Retrieved on Aug. 24, 2017 from the Internet at <URL: http://tinyurl.com/nzbqtr3>.
Pat Bosshat et al., "P4: Programming Protocal-Independent Packet Processors", ACM SIGCOMM Computer Communication Review, Jul. 2014, pp. 88-95, No. 3, vol. 44.
Naga Katta et al., "HULA: Scalable Load Balancing Using Programmable Data Planes", SOSR'16, Mar. 14-15, 2016, ACM.
Radhika Niranjan Mysore et al., "PortLand: A Scalable Fault-Tolerant Layer 2 Data Center Network Fabric", SIGCOMM'09, Aug. 17-21, 2009, ACM.
"Cisco's Massively Scalable Data Center", Sep. 2015, Retrieved from <URL: http://www.cisco.com/c/dam/en/us/td/docs/solutions/Enterprise/Data_Center/MSDC/1-/MSDC_AAG_1_pdf>.
"BCM56850 Series: High-Capacity StrataXGS Trident II Et ernet Switc Series", Broadcom, Retrieved on Aug. 25, 2017 from the Internet at <URL: http://www.broadcom.com/products/Switching/Data-Center/BCM56850-Series>.
Shuihai Hu et al., "Explicit Path Control in Commodity Data Centers: Design and Applications", Proceedings of the 12th USENIX Symposium on Networked Systems Design and Implementation (NSDI'15), May 4-6, 2015, pp. 15-28.
Albert Greenberg et al., "VL2: A Scalable and Flexible Data Center Network", SIGCOMM'09, Aug. 17-21, 2009, ACM.
Chuanxiong Guo et al., "BCube: A High Performance, Server-centric Network Architecture for Modular Data Centers", SIGCOMM'09, Aug. 17-21, 2009, pp. 63-74, ACM.
Eleftheria Athanasopoulou et al., "Backpressure-based Packet-by-Packet Adaptive Routing in Communication Networks", IEEE/ACM Trans. Netw., vol. 21, pp. 244-257, Feb. 2013.
Baruch Awerbuch et al., "A Simple Local-Control Approximation Algorithm for Multicommodity Flow", Proceedings of the 34th IEEE Conf. on Found. of Computer Science, Oct. 1993.
"The P4 Language Specification", The P4 Language Consortium—Version 1.1.0, Nov. 18, 2015, pp. 109.
Sivasankar Radhakrishnan et al., "Dahu: Commodity Switches for Direct Connect Data Center Networks", ANCS, 2013, pp. 59-70, IEEE Press.
Anirudh Sivaraman et al., "Packet Transactions: A Programming Model for Data-Plane Algorithms at Hardware Speed", CoRR, 2015.
"Protocol-independent Switch Architecture," Jun. 4, 2015, Retrieved from <URL: http://schd.ws/hosted_files/p4workshop2015/c9/NickM-P4-Workshop-June-04-2015.pdf>.
"Members of the p4 consortium", Retrieved from <URL: http://p4.org/join-us/>.
Anirudh Sivaraman, "P4's Action-execution Semantics and Conditional Operators," Massachusetts Institute of Technology, Retrieved from the <URL: https://github.com/anirudhSK/p4-semantics/raw/master/p4-semantics.pdf>.
Mohammad Alizadeh et al., Data Center TCP (DCTCP), SIGCOMM'10, Aug. 30-Sep. 3, 2010, ACM.

(56) References Cited

OTHER PUBLICATIONS

Keqiang HE et al., "Presto: Edge-based Load Balancing for Fast Datacenter Networks", SIGCOMM'15, Aug. 17-21, 2015, ACM.

Costin Raiciu et al., "Improving Datacenter Performance and Robustness with Multipath TCP", SIGCOMM'11, Aug. 15-19, 2011, pp. 266-277, ACM.

Wei Bai et al., "Information-Agnostic Flow Scheduling for Commodity Data Centers", NSDI'15, 2015, pp. 455-468, USENIX Association.

David Zats et al., "DeTail: Reducing the Flow Completion Time Tail in Datacenter Networks", SIGCOMM'12, Aug. 13-17, 2012, pp. 139-150, ACM.

Srikanth Kandula et al., "Walking the Tightrope: Responsive Yet Stable Traffic Engineering", SIGCOMM'05, Aug. 21-26, 2005, ACM.

Anwar Elwalid et al., "MATE: MPLS Adaptive Traffic Engineering", IEEE INFOCOM, 2001.

Nithin Michael et al., "HALO: Hop-by-Hop Adaptive Link-State Optimal Routing", IEEE/ACM Transactions on Networking, Dec. 2015, pp. 1862-1875, No. 6, vol. 23.

Zhiruo Cao et al., "Performance of Hasing-Based Schemes for Internet Load Balancing", IEEE INFOCOM, 2000, pp. 332~341.

Communication Pursuant to Article 94(3) EPC, Application No. 17 719 462.8-1216, dated Oct. 9, 2019.

Changhoon Kim et al., "In-band Network Telemetry (INT)", Jun. 2016, pp. 28.

Vimalkumar Jeyakumar et al., "Millions of Little Minions: Using Packets for Low Latency Network Programming and Visibility", SIGCOMM'14, Aug. 17-22, 2014.

\* cited by examiner

CONGESTION-AWARE LOAD BALANCING IN DATA CENTER NETWORKS

CROSS-REFERENCE TO RELATED APPLICATION

The present application claims the benefit of U.S. Provisional Application No. 62/321,725, filed Apr. 12, 2016, which is incorporated herein by reference in its entirety.

BACKGROUND

Unless otherwise indicated herein, the approaches described in this section are not admitted to be prior art by inclusion in this section.

Data center networks generally employ multi-rooted topologies that are characterized by a large degree of multipathing. For example, physical servers are connected with each other using a number of switches that provide alternative paths for packet forwarding. When a physical server has data to send to another physical server, one of the paths may be selected to transmit the data as a flow of packets. In practice, traffic may not be evenly distributed across the different paths, which may cause over-utilization of one path and under-utilization of another. Load balancing is important to spread the traffic as evenly as possible to reduce congestion and improve network performance.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

The challenges of load balancing in data center networks will be described in more detail with reference to FIG. 1, which is a schematic diagram illustrating example data center network 100 in which congestion-aware load balancing is performed. It should be understood that data center network 100 may include additional and/or alternative components than that shown, depending on the desired implementation.

As used herein, the term "switch" may refer generally to any suitable network element configured to receive and forward packets, which may layer-3 router, layer-2 switch, gateway, bridge, etc. Depending on the network topology, a "switch" may be a software virtual switch, top-of-rack (ToR) switch, aggregate switch, spine switch, etc. The term "layer-2" generally refers to a Media Access Control (MAC) layer and "layer-3" to a network layer in the Open System Interconnection (OSI) model, although the concepts described herein may be applicable to other networking models. The term "endpoint" may refer generally an originating node ("source endpoint") or terminating node ("destination endpoint") of a bi-directional inter-process communication flow. In practice, an endpoint may be a physical computing device, a virtualized computing instance supported by a physical computing device, etc.

A virtualized computing instance may represent a workload, virtual machine, addressable data compute node, isolated user space instance, etc. In practice, any suitable technology may be used to provide isolated user space instances, including but not limited to hardware virtualization. Other virtualized computing instances may include containers (e.g., running on top of a host operating system without the need for a hypervisor or separate operating system such as Docker, etc.; or implemented as an operating system level virtualization), virtual private servers, etc. The virtual machines may also be complete computational environments, containing virtual equivalents of the hardware and software components of a physical computing system. The term "hypervisor" may refer generally to a software layer or component that supports the execution of multiple virtualized computing instances, including system-level software that supports namespace containers such as Docker, etc. The term "packet" may refer generally to a group of bits that can be transported together, and may be in another form, such as "frame", "message", "segment", etc.

Figure 1:
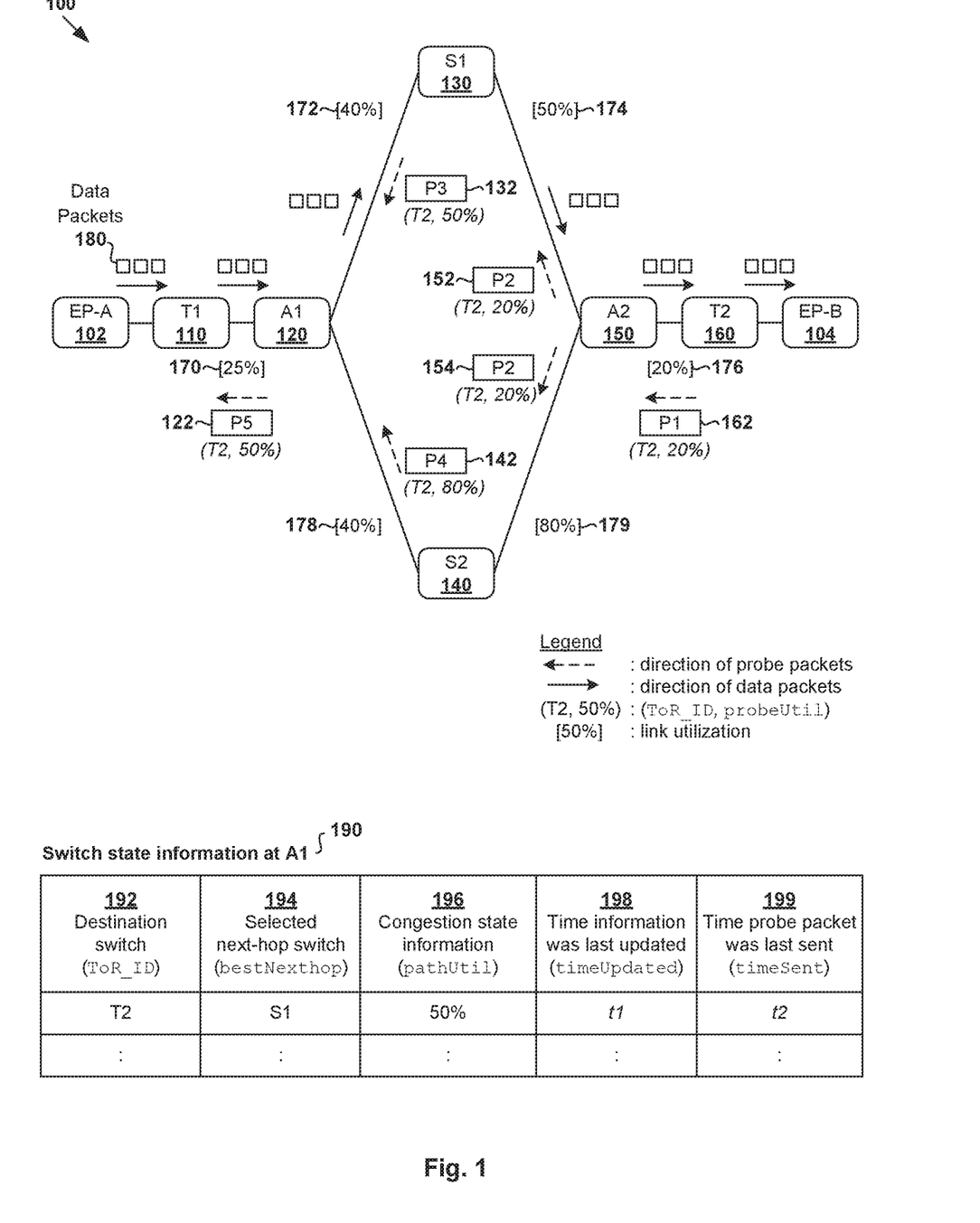
FIG. 1 is a schematic diagram illustrating example data center network in which congestion-aware load balancing is performed.

In the example in FIG. 1, data center network 100 includes first endpoint 102 (see "EP-A") and second endpoint 104 (see "EP-B") that are connected via multiple paths provided by physical network switches "T1" 110, "A1" 120, "S1" 130, "S2" 140, "A2" 150 and "T2" 160. For example, for "EP-A" 102 to send data to "EP-B" 104, "EP-A" 102 may forward data packets 180 to "T1" 110 and "A1" 120. At "A1" 120, there are two alternative paths: a first path via "S1" 130 and a second path via "S2" 140 to reach "A2" 150, "T2" 160 and "EP-B" 104. Although two alternative paths are shown for simplicity, the number of paths depends on the number of inter-connected switches and the topology of data center network 100, such as a multi-rooted topology (e.g., leaf-spine topology, fat-tree topology, etc.) that provides bisection bandwidth.

In practice, traffic load may be unevenly spread among different paths in data center network 100, which may cause congestion and performance degradation. Conventionally, equal cost multipath routing (ECMP) is commonly used as a data plane load balancing mechanism to spread traffic uniformly across multiple paths with equal costs (e.g., equal number of hops). ECMP switches use a simple, hash-based load balancing scheme to assign each new traffic flow to one of the available paths at random. ECMP is usually implemented in custom silicon (e.g., application-specific integrated circuit (ASIC)), which lacks flexibility to update the load balancing scheme. Further, ECMP is congestion-agnostic and does not protect against oversubscription of paths that causes performance degradation.

For example in FIG. 1, links connecting different pairs of switches have different congestion levels, as indicated using link utilization levels (see 170-179 in square brackets) for packets travelling from "EP-A" 102 to "EP-B" 104. Along the first path via "S1" 130, the link utilization levels are 25% (see 170); 40% (see 172); 50% (see 174); and 20% (see 176). Along the second path via "S2" 140, the link utilization levels are 25% (see 170); 40% (see 178); 80% (see 179) and 20% (see 176). Since ECMP does not consider the different congestion levels, it is possible that long-running flows are assigned to the more congested second path via "S2" 140.

Conventionally, control-plane load balancing mechanisms have also been used to address the shortcomings of ECMP. In this case, instead of selecting paths at random, a central controller is deployed in data center network 100 to collect statistics from, and push forwarding rules to, switches 110-160 to implement control plane load balancing. However, since a central controller is required, control plane mechanisms are relatively slow due to high control loop latency and incapable of handling highly volatile traffic.

Conventionally, host-based approaches have also been used to address the shortcomings of ECMP. For example, a modified version of transmission control protocol (TCP) called multipath TCP (MPTCP) may be used to establish multiple subflows between endpoints to split traffic over different paths. However, host-based approaches usually require changes to all the end hosts, such as modifying the protocol stack of the end hosts in the case of MPTCP. Such changes are usually challenging (and impossible in some cases), especially when the end hosts are running different operating systems, or controlled by different entities.

Congestion-Aware Load Balancing

According to examples of the present disclosure, a congestion-aware load balancing approach may be implemented by switches 110-160 in data center network 100 to reduce congestion and improve network performance. For example in FIG. 1, congestion state information may be communicated in a hop-by-hop manner from "T2" 160 to "T1" 110 using probe packets labelled "P1" 162, "P2" 152, "P2" 154, "P3" 132, "P4" 142 and "P5" 122 (see arrows in dotted line).

Each switch may perform stateful packet processing to process the congestion state information to facilitate subsequent forwarding of data packets 180 in an opposite direction (see arrows in full line), such as from source endpoint "EP-A" 102 to destination endpoint "EP-B" 104. As used herein, the term "congestion state information" may refer generally to any suitable information indicating a level of congestion, such as link utilization level in FIG. 1 (see 170-179). In practice, any additional or alternative indicator(s) may be used, such as queue occupancy, per-hop latency, etc.

In the following, an example will be described using "A1" 120 as a "first switch"; S2" 130 and "S3" 140 as "next-hop second switches"; "T2" 160 as "third switch" or "destination switch"; "T1" 110 as "fourth switch" or "source switch"; "EP-A" 102 as "source endpoint"; and "EP-B" 104 as "destination endpoint." The terms "first," "second," "third," etc. do not denote any order of importance, but are rather used to distinguish one element from another. The terms "next-hop switch" and "previous-hop switch" are relative. For example, from the perspective of "A1" 120, "T1" 110 is a previous-hop switch while S2" 130 and "S3" 140 are next-hop switches for data packets 180 travelling towards "T2" 160.

Figure 2:
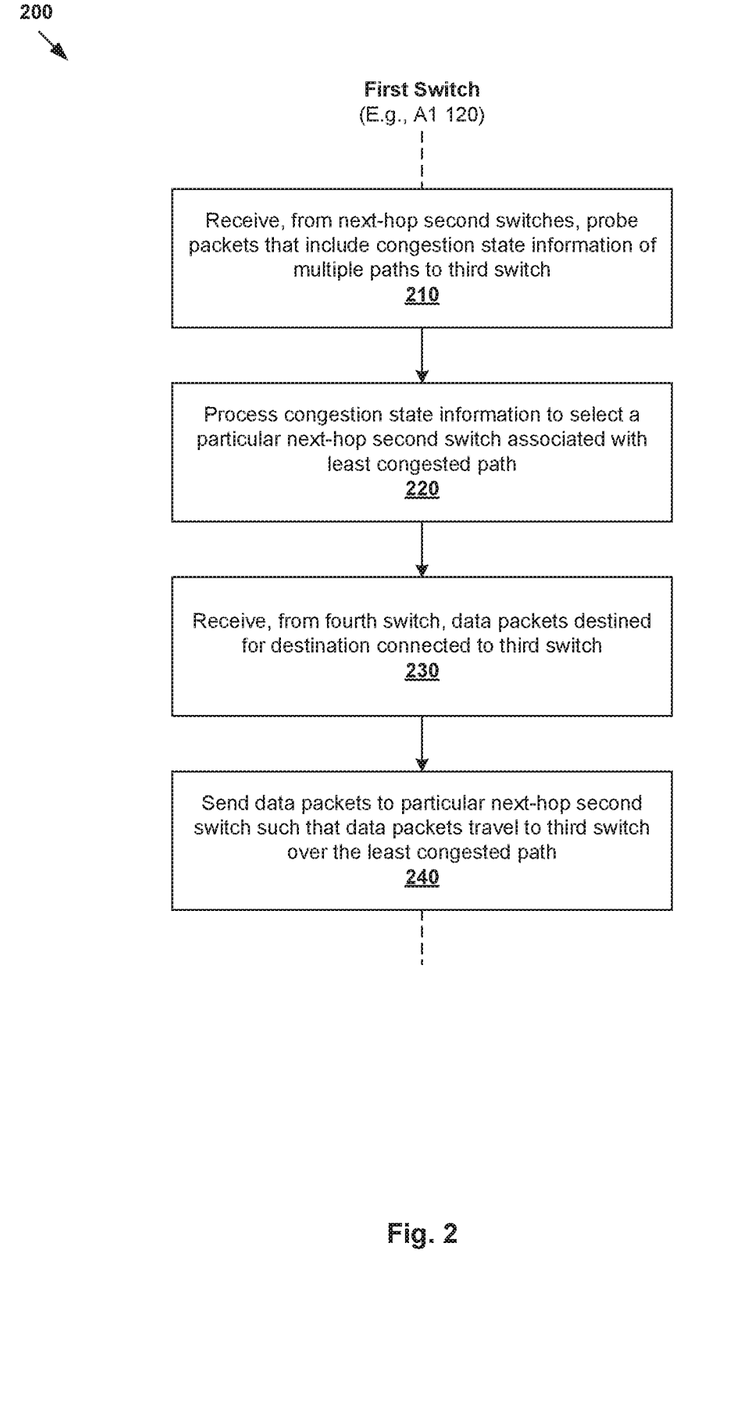
FIG. 2 is a flowchart of an example process for a switch to perform congestion-aware load balancing in a data center network.

In more detail, FIG. 2 is a flowchart of example process 200 for a first switch to perform congestion-aware load balancing in data center network 100. Example process 200 may include one or more operations, functions, or actions illustrated by one or more blocks, such as 210 to 240. The various blocks may be combined into fewer blocks, divided into additional blocks, and/or eliminated depending on the desired implementation.

At 210 in FIG. 2, "A1" 120 receives multiple probe packets 132, 142 from respective next-hop switches "S1" 130 and "S2" 140. For example in FIG. 1, probe packet "P3" 132 identifies destination switch "T2" 160 and includes congestion state information of a first path from "S1" 130 to destination switch "T2" 160. Similarly, probe packet "P4" 142 identifies destination switch "T2" 160 and includes congestion state information of a second path from "S2" 140 to destination switch "T2" 160.

For example, each probe packet may be a minimum sized packet of 64 bytes that includes a probe header in addition to a layer-2 Ethernet header and a layer-3 IP header. The header of a probe packet may include (TOR_ID, probeUtil), where TOR_ID is an identifier of a destination switch (e.g., TOR_ID="T2" 160) and probeUtil represents congestion state information of a path if the probe packet were to travel in an opposite direction towards the destination switch using that path. As will be described further below, probe packets may be sent periodically and separately from data packets 180 to gather and distribute congestion state information within data center network 100.

At 220 in FIG. 2, "A1" 120 processes the congestion state information in each probe packet 132, 142 to select a selected next-hop switch associated with a least congested path from "A1" 120 to "T2" 160. For example in FIG. 1, "A1" 120 selects "S1" 130 based on congestion state information in first probe packet "P3" 132 and second probe packet "P4" 142. As will be described further using FIG. 3 and FIG. 4, probe packets "P3" 132 and "P4" 142 may arrive at "A1" 120 at different times and/or processed separately to select "S1" 130 as the selected next-hop switch.

To facilitate subsequent data packet forwarding, "A1" 120 may store "switch state information" (see 190 in FIG. 1) that associates destination switch "T2" 160 (see "TOR_ID" at 192) with the selected next-hop switch (see "bestNexthop" at 194; also referred to as the "best next-hop"), congestion state information (see "pathUtil" at 196) and a time the selected next-hop switch is updated (see "timeUpdated" at 198). To control the number of probe packets sent by "A1" 120, a time at which a probe packet associated with destination switch "T2" 160 was last sent (see "timeSent" at 199) is also stored. In practice, any suitable number of data structures (e.g., tables indexed by "TOR_ID") may be used to store switch state information 190.

At 230 in FIG. 2, "A1" 120 receives data packets 180 from "T1" 110 that are destined for "EP-B" 104 connected with "T2" 160. For example in FIG. 1, data packets 180 are sent by source endpoint "EP-A" 102 connected to "A1" 120 via "T1" 110.

At 240 in FIG. 2, in response to receiving data packets 180, "A1" 120 sends data packets 180 to selected next-hop switch "S1" 130 such that data packets travel to "T2" 160 via the least congested path from "A1" 120 to "T2" 160 via "S1" 130.

As will be described further using FIG. 3 and FIG. 4, each probe packet 132/142 received by "A1" 120 may include congestion state information of a least congested path (also referred to as "best path") from its sender 130/140 to destination switch "T1" 110. For example, first probe packet "P3" 132 summarizes the best path information by setting probeUtil=50%, which is the maximum link utilization (see 174) along the first path from "S1" 130 to destination "T2" 160. Similarly, second probe packet "P4" 142 summarizes the best path information by setting probeUtil=80%, which is the maximum link utilization (see 179) along the second path from "S2" 140 to destination "T2" 160.

As will be described further using FIG. 3 and FIG. 4, the transmission of probe packets may be initiated by the destination switch, such as "T2" 160 in FIG. 1. Probe packets may be initiated periodically at any suitable time interval. For example, "T2" 160 may first send probe packet "P1" 162 to "A2" 150, which in turn sends probe packets "P2" 152 to "S1" 130 and "P2" 154 to "S2" 140. This continues at "S1" 130 and "S2" 140, which send respective probe packets "P3" 132 and "P4" 142 to "A1" 120. In response to the selection of "S1" 130 as the best next-hop switch, "A1" 120 may then send probe packet "P5" 122 to "T1" 110.

Each probe packet may be used to summarize the best path information from the sender to the destination switch. For example in FIG. 1, probe packets "P1" 162, "P2" 152 and "P2" 154 include (T2, 20%), where probeUtil=20% is the maximum utilization level of the path from "A2" 150 to "T2" 160. Probe packet "P3" 132 includes (T2, 50%), where probeUtil=50% is the maximum utilization level of the path from "S1" 130 to "T2" 160. Probe packet "P4" 142 from "S2" 140 includes (T2, 80%), where probeUtil=80% is the maximum utilization level of the path from "S2" 140 to "T2" 160. Similarly, probe packet "P5" 122 from "A1" 120 includes (T2, 50%), where probeUtil=50% is the maximum utilization level of the best path from "A1" 120 to "T2" 160 via selected next-hop "S1" 130.

In the following, various examples of the present disclosure will be described. In particular, example probe packet processing will be described using FIG. 3 and FIG. 4; and example data packet processing using FIG. 5 and FIG. 6.

Probe Packet Processing

Example probe packet processing according to blocks 210 and 220 in FIG. 2 will be described further using FIG. 3, which is a flowchart of example process 300 for a switch to perform probe packet processing in data center network 100. Example process 300 may include one or more operations, functions, or actions illustrated by one or more blocks, such as 310 to 370. The various blocks may be combined into fewer blocks, divided into additional blocks, and/or eliminated depending on the desired implementation.

Using the example in FIG. 1, "A1" 120 may perform example process 300 to process probe packets 132, 142 and select "S1" 130 as the selected next-hop switch for destination switch "T2" 160. Example process 300 may be performed to process one probe packet at a time to determine whether to update switch state information 190. In the following, two iterations of example process 300 will be described: a first iteration for "P3" 132 from "S1" 130, and a second iteration for "P4" 142 from "S2" 140.

(1) First Iteration for Probe Packet "P3" 132

Figure 3:
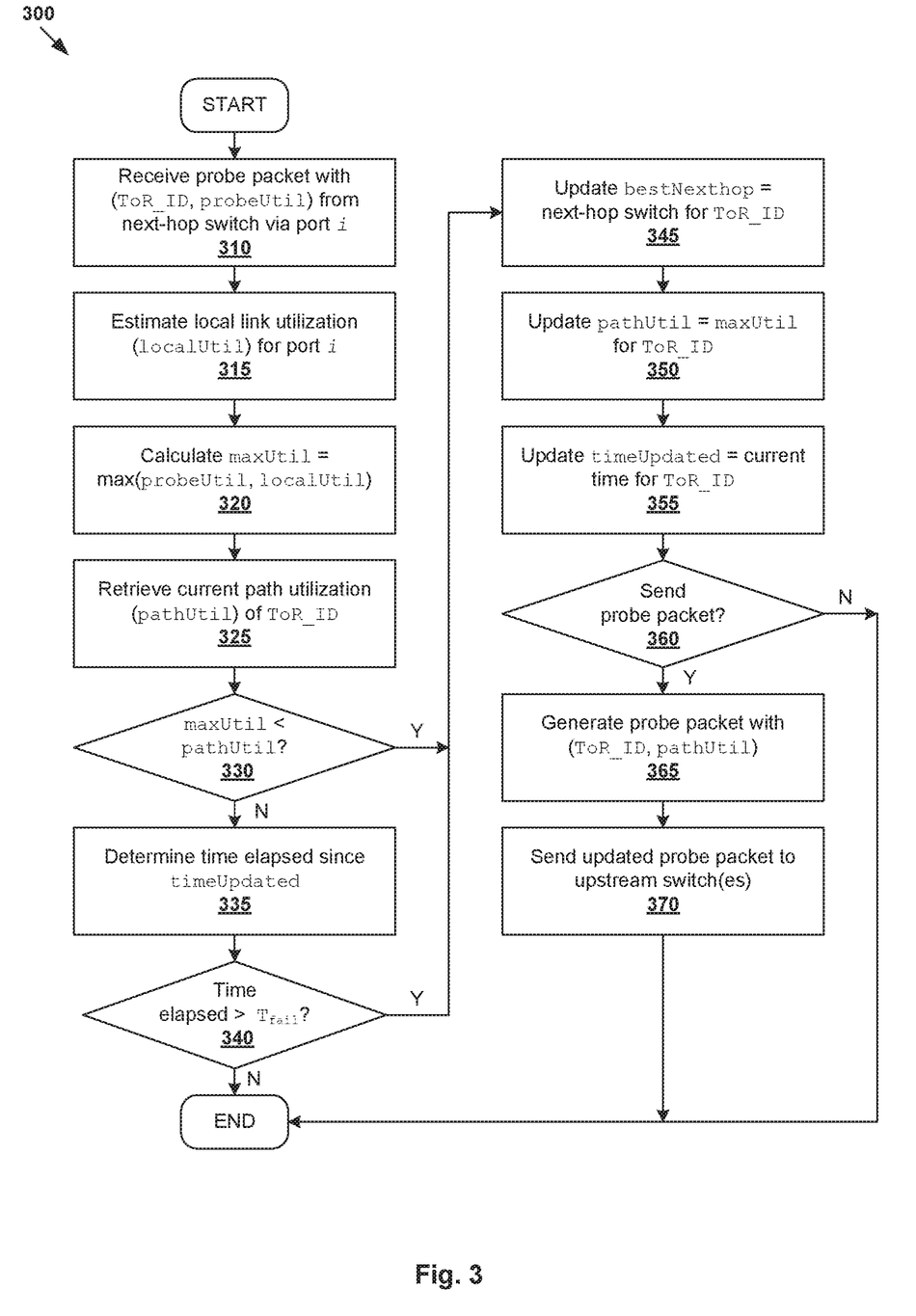
FIG. 3 is a flowchart of an example process for a switch to perform probe packet processing in a data center network.

At 310 in FIG. 3, "A1" 120 receives probe packet 132 from next-hop switch "S1" 130 via a port (denoted port "i") of "A1" 120. The header of probe packet 132 includes (ToR_ID, probeUtil), where ToR_ID="T2" 160, and probeUtil=50% (i.e., 50%>20%; see 174 and 176 in FIG. 1) summarizes the maximum utilization level of the best path from "S1" 130 to "T2" 160 via "A2" 150.

At 315 in FIG. 3, "A1" 120 proceeds to estimate local congestion state information associated with port i via which probe packet 132 is received from "S1" 130, such as in the form of a local link utilization level (localUtil) for port i. For example in FIG. 1, transmit (TX) utilization localUtil=40% (see 172) for an egress port connecting "A1" 120 with "S1" 130. To perform the estimation, each switch may maintain a link utilization estimator per switch port. Any suitable estimator may be used, such as the following exponentially weighted moving average generator (EWMA):

$$U = D + U * \left(1 - \frac{\Delta t}{\tau}\right).$$

In the above equation, U is the link utilization estimator, D is the size of the outgoing packet that triggers the update for the estimator, $\Delta t$ is the amount of time passed since the last update to the estimator, and $\tau$ is a time constant. In steady state, this estimator is equal to $C \times \tau$ where C is the outgoing link bandwidth. This assumes that the probe packet can access both the receive (RX) and TX utilization of port i.

At 320 in FIG. 3, "A1" 120 performs a first comparison to determine which of the following indicates a higher level of congestion: (a) probeUtil=50% in received probe packet "P3" 132; and (b) localUtil=40%. In particular, "A1" 120 calculates maxUtil=max (probeUtil, localUtil)=max(50%, 40%)=50%. Since probeUtil=max(50%, 20%) as discussed above, maxUtil=max(max(50%, 20%), 40%)=50%, which represents the maximum link utilization level along the first path from "A1" 120 to "T2" 160 via "S1" 130.

At 325 and 330 in FIG. 3, "A1" 120 retrieves the current path utilization (pathUtil 196) associated with destination switch "T2" 160 from switch state information 190, and performs a second comparison to determine which of the following indicates a lower level of congestion: maxUtil and pathUtil. The first comparison at 320 and second comparison at 330 represents a min-max path utilization calculation.

If maxUtil≥pathUtil, "A1" 120 also checks whether the current pathUtil associated with "T2" 160 should be aged. In particular, at 335 and 340 in FIG. 3, "A1" 120 determines whether the time elapsed since timeUpdated is more than a predetermined threshold (e.g., $T_{fail}$ seconds). The value of timeUpdated represents the time at which switch state information 190 associated with destination switch "T2" 160 was last updated by a probe packet received from bestNextHop. Tracking timeUpdated allows "A1" 120 to implement an aging mechanism for pathUtil and bestNexthop. In practice, any suitable value of $T_{fail}$ may be set as a threshold for detecting link failures on the data plane.

If switch state information 190 associated with particular destination switch "T2" 160 and particular bestNextHop is not refreshed for longer than $T_{fail}$ seconds (i.e., current time−timeUpdated>$T_{fail}$), "A1" 120 assumes that there is a failure associated with the current bestNexthop. In this case, any probe packet associated with "T2" 160 will trigger an update. This way, in addition to learning the best forwarding paths from the probe packets, "A1" 120 may learn about link failures in data center network 100 based on the absence of probe packets on the data plane. This data-plane approach should be contrasted against conventional control-plane approaches that rely on a central controller to detect link failures and inform the relevant switches. The data-plane approach is generally faster than failure recovery mechanisms that are induced by the control plane and occur at network RTT timescales.

At 345, 350 and 355 in FIG. 3, in response to determination that either maxUtil<pathUtil (see 330) or the time elapsed>$_{fail}$ (see 340), "A1" 120 updates switch state information 190 associated with destination switch ToR_ID="T2" 160. For example, "A1" 120 stores bestNexthop(ToR_ID)="S1" 130 (e.g., the port via which probe packet 132 is received at 345), pathUtil(ToR_ID)= maxUtil=50% at 350, and new timeUpdated(ToR_ID)=t1 at 355.

At 360 in FIG. 3, "A1" 120 determines whether to send a probe packet to a neighboring switch. For example, this may involve determining whether the time elapsed since timeSent (see 199 in FIG. 1) associated with destination switch "T2" 160 is more than a predetermined threshold. The value of timeSent represents the time at which "A1" 120 last sent a probe packet associated with destination switch "T2" 160. If a probe packet is required, "A1" 120 proceeds to blocks 365 and 370, but otherwise process 300 ends.

Block 360 in FIG. 3 may be performed to manage and optimize the number of probe packets sent from one switch to another. In a naive model, "A1" 120 sends a probe packet to "T1" 110 whenever it receives a probe packet. In this case, within a particular time window, "A1" 120 may send multiple probe packets associated with destination switch "T2" 160. The determination at block 360 may be used to suppress the number of probe packets that can be sent within that time window to reduce the associated overhead.

Although it is possible that switch state information 190 is updated twice within a particular time window and a new next-hop switch is selected for a particular destination switch, this updated information may be sent in the next window (assuming it is not updated again). This means that the total number of probe packets sent by a particular switch (e.g., "A1" 120) is proportional to the number of destination switches in data center network 100, instead of the number of possible paths that the probe packets may take to arrive at that switch.

At 365 in FIG. 3, in response to determination that probe packet should be sent, "A1" 120 generates probe packet "P5" 122 for transmission to neighboring switch "T1" 110. For example in FIG. 1, probe packet "P5" 122 may be generated by replicating probe packet "P3" 132 from "S1" 130 because both probe packets 122, 132 include the same (ToR_ID="T2" 160, probeUtil=50%). In practice, probe packets 122, 132 may have different values of probeUtil, in which case the header of probe packet 132 from "S1" 130 is modified to generate probe packet "P5" 122.

At 370 in FIG. 3, "A1" 120 determines the recipient of probe packet 122 to be neighboring upstream switch "T1" 110, and sends or propagates probe packet 122 to "T1" 110 accordingly. Although only one recipient of probe packet 122 is shown in FIG. 1 for simplicity, it should be understood that a switch may be connected to multiple neighboring upstream or previous-hop switches in practice.

(2) Second Iteration for Probe Packet "P4" 142

Example process 300 may be performed by "A1" 120 to process probe packet "P4" 142 from "S2" 140 that includes (ToR_ID="T2" 160, probeUtil=80%). Similarly, at 310 and 315 in FIG. 3, "A1" 120 estimates local congestion state information associated with port i via which probe packet "P4" 142 is received. For example, the transmit utilization of port i is localUtil=40% (see 178) for the link connecting "A1" 120 and "S2" 140. At 320 in FIG. 3, "A1" 120 calculates maxUtil=max (probeUtil, localUtil)=max(80%, 40%)=80%.

At 325 in FIG. 3, "A1" 120 retrieves pathUtil=50% associated with destination switch "T2" 160 from switch state information 190, and performs a second comparison to determine whether maxUtil or pathUtil indicates a lower level of congestion. Since maxUtil=80%>pathUtil=50%, "A1" 120 proceeds to 335 and 340 in FIG. 3. At 335 in FIG. 3, "A1" 120 determines whether the time elapsed since timeUpdated is more than predetermined threshold T$_{fail}$.

Assuming that probe packet "P4" 142 from "S2" 140 is processed not more than T$_{fail}$ seconds after timeUpdated, example process 300 ends at 335 in FIG. 3 and it is not necessary to update switch state information 190. Otherwise (i.e., T$_{fail}$ exceeded), "A1" 120 proceeds to update switch state information 190 according to 345, 350 and 355. Further, if the determination at 360 is affirmative, "A1" 120 sends a probe packet to upstream switch "T1" 110 according to 365 and 370 in FIG. 3.

According to example process 300, switch state information 190 only maintains a current best next-hop switch (e.g., bestNexthop="S1" 130) for a particular destination switch (e.g., ToR_ID="T2" 160) until a better option associated with a lower congestion level is discovered. This may lead to a sub-optimal choice, but the choice should eventually converge to the optimal choice within a few windows of probe packet circulation.

In practice, a larger matrix may be used to store (ToR_ID, bestNexthop, maxUtil) for each next-hop switch. In this case, each entry is indexed by both the destination switch and next-hop switch, and the best next-hop switch may be determined by taking a minimum of the maxUtil values. For example, since maxUtil=50% for "S1" 130 and maxUtil=80% for "S2" 140, "S1" 130 will be selected as the best next-hop switch for destination switch "T2" 160.

Multi-Rooted Topology

Figure 4:
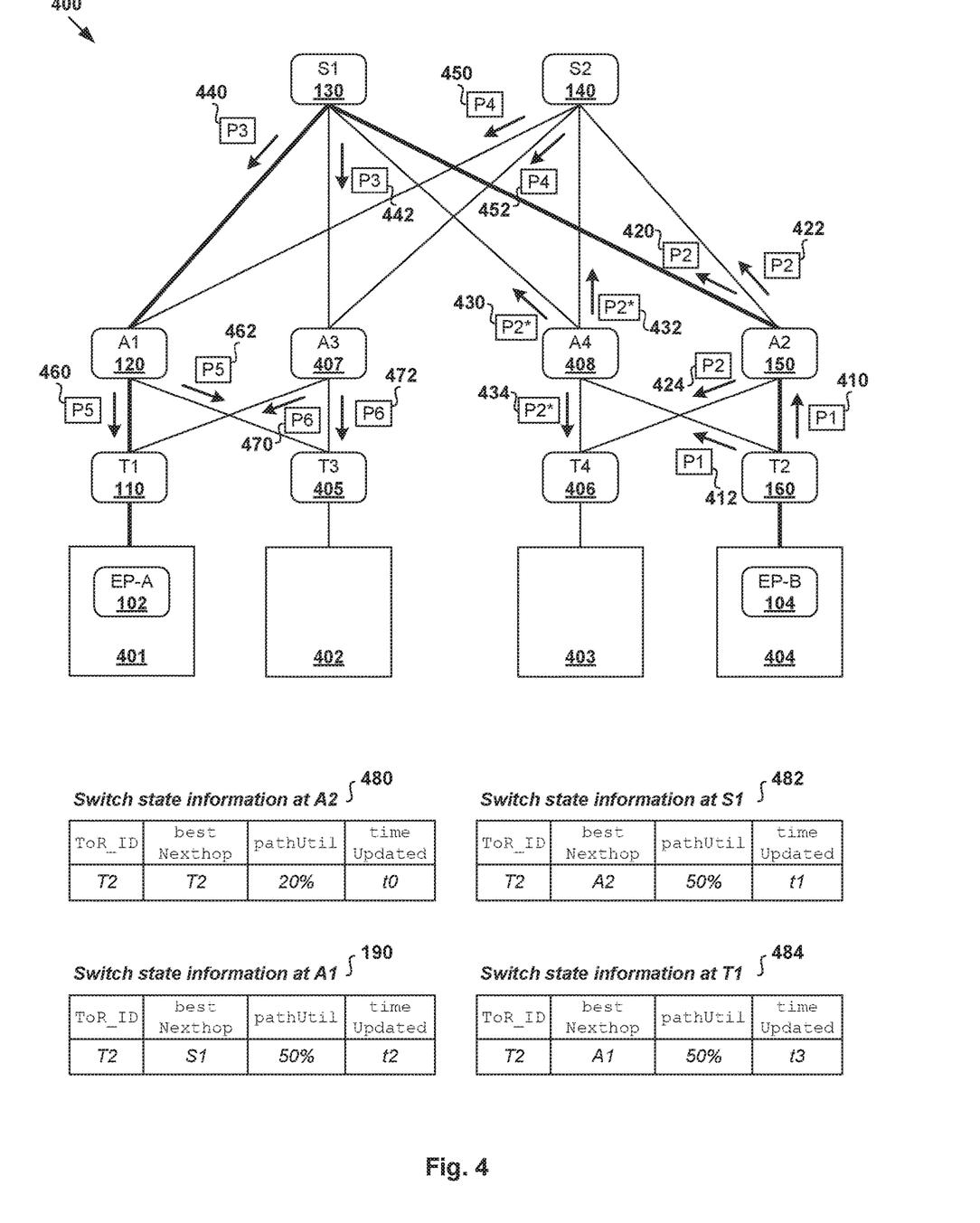
FIG. 4 is a schematic diagram illustrating an example data center network with a multi-rooted topology in which probe packet processing is implemented.

Example process 300 will be further explained using FIG. 4, which is a schematic diagram illustrating example data center network 400 with a multi-rooted topology in which probe packet processing is implemented. It should be understood that data center network 400 may include additional and/or alternative components than that shown, depending on the desired implementation. For simplicity, the same reference numbers are used for elements introduced using FIG. 1, such as "EP-A" 102, "EP-B" 104, "T1" 110, "T2" 160, "A1" 120, "A2" 150, "S1" 130, "S2" 140, etc.

In the example in FIG. 4, server racks 401-404 are used to house various physical servers. "EP-A" 102 is hosted by one physical server on left-most rack 401, and "EP-B" 104 by another physical server on right-most rack 404. Racks 401-404 are inter-connected using multiple tiers of switches, including ToR switches (e.g., "T1" 110, "T2" 160, "T3" 405 and "T4" 406) forming a first tier, aggregate switches (e.g., "A1" 120, "A2" 150, "A3" 407, "A4" 408) forming a second tier, and spine switches (e.g., "S1" 130 and "S2" 140) forming a third tier. In practice, the number of tiers (i.e., depth) may depend on the bandwidth capacity required in data center network 400.

A switch may be referred to as "downstream" or "upstream" from the perspective of another switch depending on their relative position. For example, if a switch is in tier j (e.g., "A1" 120 on tier j=2), a directly connected switch in a lower tier k<j is known as its "downstream" switch (e.g., "T1" 110 and "T3" 405 in lower tier k=1). On the other hand, a directly connected switch in an upper tier k>j is known as its "upstream" switch (e.g., "S1" 130 and "S2" 140 in upper tier k=3). It should be understood that any other suitable topology than that shown in FIG. 4 may be used. For example, topologies such as fat-tree, Clos, Virtual Layer 2 (VL2), etc. also use the notions of "upstream" and "downstream."

In the example in FIG. 4, various example probe packets labelled "P1" to "P6" are sent by various switches to disseminate congestion state information (e.g., path utilization information) in data center network 400. If a probe packet is received from a downstream switch, it will be replicated or propagated to all other upstream and downstream switches. However, if a probe packet is received from an upstream switch, the probe packet is only replicated or propagated to all downstream switches, but not the upstream switches. This ensures that no probe packet loops forever in data center network 400. In practice, any other alternative or additional techniques may be used to prevent probe packets from looping forever, such as setting a time to live (TTL) parameter in the probe packets.

In practice, a probe packet may be generated using a central processing unit (CPU) of a switch, a data plane of the switch, or a physical server attached to the switch. The term "probe replication" or "probe propagation" may be used interchangeably to refer generally to the dissemination of congestion state information using probe packets. The probe replication process may be initiated by a particular ToR switch (e.g., "T2" 160) and probe packets are propagated until they reach another ToR switch (e.g., "T1" 110, "T3" 405 and "T4" 406).

Referring first to ToR switch "T2" 160 in FIG. 4, probe packets labelled "P1" are sent to aggregate switches "A2" 150 (see 410) and "A4" 408 (see 412), respectively. Probe packets 410, 412 each include a header with (ToR ID="T2" 160, probeUtil). For example, probeUtil of probe packet 410 destined for "A2" 150 may be set to a link utilization level of an ingress port via which "T2" 160 receives data packets from "A2" 150. Similarly, probe packet 412 destined for "A4" 408 may be set to a link utilization level of an ingress port via which "T2" 160 receives packets from "A4" 408.

At aggregate switch "A2" 150 in FIG. 4, in response to processing probe packet "P1" 410, "A2" 150 sends probe packets labelled "P2" to upstream spine switches "S1" 130 (see 420) and "S2" 140 (see 422), and downstream ToR switch "T4" 406. Similarly, in response to processing probe packet "P1" 412, "A4" 408 sends probe packets labelled "P2*" (note asterisk) to upstream "S1" 130 (see 430) and "S2" 140 (see 432), as well as downstream "T4" 406 (see 434). Since the journey of a probe packet ends once it reaches another ToR switch, it is not necessary for "T4" 406 to send any probe packet to other switches.

At spine switch "S1" 130 in FIG. 4, in response to processing probe packets "P2" 420 and "P2*" 430, "S1" 130 sends probe packets labelled "P3" to downstream "A1" 120 (see 440) and "A3" 407 (see 442). Similarly, "S2" 140 processes "P2" 422 from "A2" 150 and "P2*" 432 from "A4" 408, and sends probe packets labelled "P4" to downstream "A1" 120 (see 450) and "A3" 407 (see 452).

At aggregate switch "A1" 120 in FIG. 4, in response to processing probe packets "P3" 440 from "S1" 130 and "P4" 450 from "S2" 140, "A1" 120 sends probe packets labelled "P5" to "T1" 110 (see 460) and "T3" 405 (see 462). Similarly, "A3" 407 processes "P4" 442 from "S1" 130 and "P5" 452 from "S2" 140, and sends probe packets labelled "P6" to "T1" 110 (see 470) and "T3" 405 (see 472). Since the journey of a probe packet ends at a ToR switch, it is not necessary for "T1" 110 and "T3" 405 to send any probe packet.

In the above examples, each switch may perform example process 300 to process and send probe packets. As discussed with reference to FIG. 3, probe packets initiated by a particular destination switch will have the same ToR_ID (e.g., "T2" 160) but may have different values of probeUtil to summarize congestion state information of the best path to the destination switch. This leads to a distance vector protocol style dissemination of best path utilization information along all paths leading to the destination switch in the reverse direction. When the change in the best path utilization is propagated further up the path, the switches may decide to choose a completely disjoint path, if necessary, to avoid the bottleneck (i.e., failed link).

According to examples of the present disclosure, the switch state information at each switch only grows with the number of destination ToR switches. In the example in FIG. 4, the best path from "T1" 110 to "T2" 160 is shown using bold lines. Following the probe replication process, local switch state information (see 480) at "A2" 150 records the best next-hop switch to "T2" 160 as "T2" 160 itself. At "S1" 130, switch state information (see 482) records "A2" 150 as the best next-hop switch to "T2" 160. At "A1" 120, switch state information (see 190) records "S1" 130 as the best next-hop switch to "T2" 160. Finally, at "T1" 110, switch state information (see 484) records "A1" 120 as the best next-hop switch to "T2" 160.

The above should be contrasted with conventional approaches that necessitate switch state information to grow according to the number of destination ToR switches multiplied by the number of paths between a pair of ToR switches (which can be quite large in practice). For example, in a fat-tree topology, the number of paths between any pair of ToR switches increases according to the radix k of the topology. To track the utilization of all desired paths to all destination ToR switches, a switch will have to track $k^2$ paths for each destination ToR switch. If there are m leaf ToR switches, then the sender needs to keep track of m×$k^2$ entries in its switch state information, which may be prohibitively large. For a topology with 10K ToR switches with 10K paths between each pair, 600M bits of memory (e.g., on an ASIC) would be required to store the path utilization matrix. This is not only prohibitively expensive but lacks scalability in larger topologies.

Data Packet Processing

Example data packet processing according to blocks 230 and 240 in FIG. 2 will be described further using FIG. 5, which is a schematic diagram illustrating example data center network 500 with a multi-rooted topology in which data packet processing is implemented. It should be understood that data center network 500 may include additional and/or alternative components than that shown, depending on the desired implementation. Similar to the example in FIG. 4, the same reference numbers are used for elements introduced using FIG. 1 and FIG. 4.

According to examples of the present disclosure, load balancing may be performed at the granularity of flowlets to avoid or ameliorate packet reordering issues associated with transport layer protocols such as TCP. This may be achieved by splitting a flow of packets into multiple smaller groups called "flowlets." A new flowlet may be detected whenever a time interval between the arrival of two consecutive packets within the same flow (i.e., inter-packet gap) exceeds a predetermined threshold (e.g., $T_{flowlet}$ seconds). All subsequent packets that do not exceed the threshold are considered to be part of the same flowlet. As used herein, the term "flowlet" may refer generally to a group or burst of packets within a flow. In practice, a new flowlet may be detected using any other approach other than the inter-packet gap, such as based on TCP segmentation offload (TSO) segments.

Figure 5:
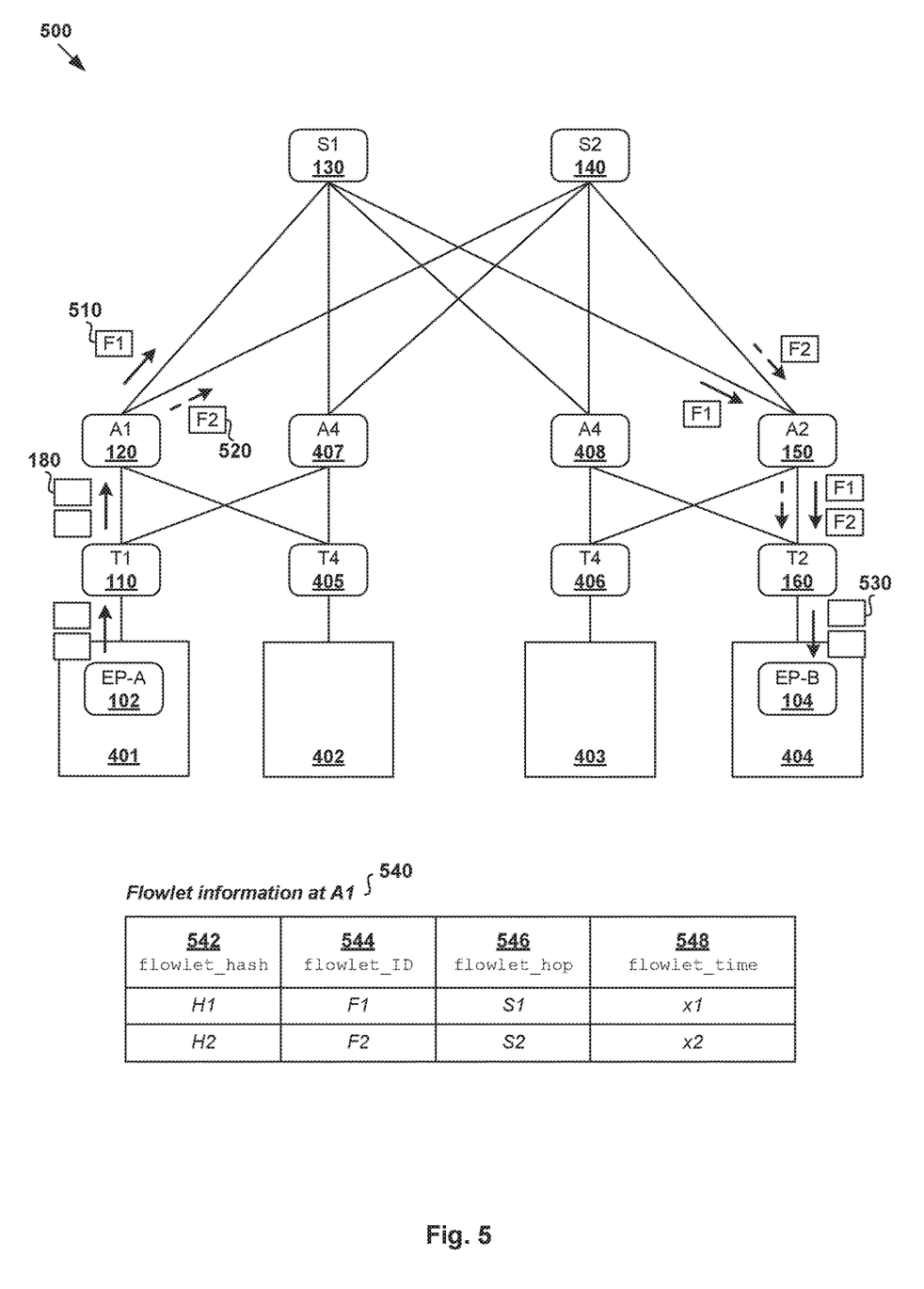
FIG. 5 is a schematic diagram illustrating an example data center network with a multi-rooted topology in which data packet processing is implemented.

In the example in FIG. 5, "A1" 120 receives a flow of data packets 180 from source switch "T1" 110. Data packets 180 originate from "EP-A" 102 and are destined for "EP-B" 104 connected to destination switch "T2" 160. Based on the inter-packet gap between consecutive packets, "A1" 120 may split the flow into two flowlets, such as "F1" 510 and "F2" 520. During the inter-packet gap, the bestNexthop (see 194 in FIG. 1) stored in switch state information 190 of "A1" 120 might change. In this case, first flowlet "F1" 510 may be forwarded via "S1" 130, and second flowlet "F2" 520 via "S2" 140.

Each switch may independently decide the next-hop switch on an instantaneous best path that any flowlet should take at a particular time. For example, "S1" 130 and "S2" 140 may both forward flowlet 510/520 to "A2" 150 to reach "T2" 160 and ultimately destination "EP-B" 104 (see 530). The idea here is that the inter-packet gap between consecutive flowlets will absorb any delays caused by congested paths on different paths. This will ensure that the flowlets will still arrive in order at the destination side, thereby not causing packet reordering issues while load balancing is performed. In practice, $T_{flowlet}$ may be set based on the network RTT. In data center networks, $T_{flowlet}$ may be in the order of a few hundreds of microseconds but may be larger in topologies with a lot of hops.

Figure 6:
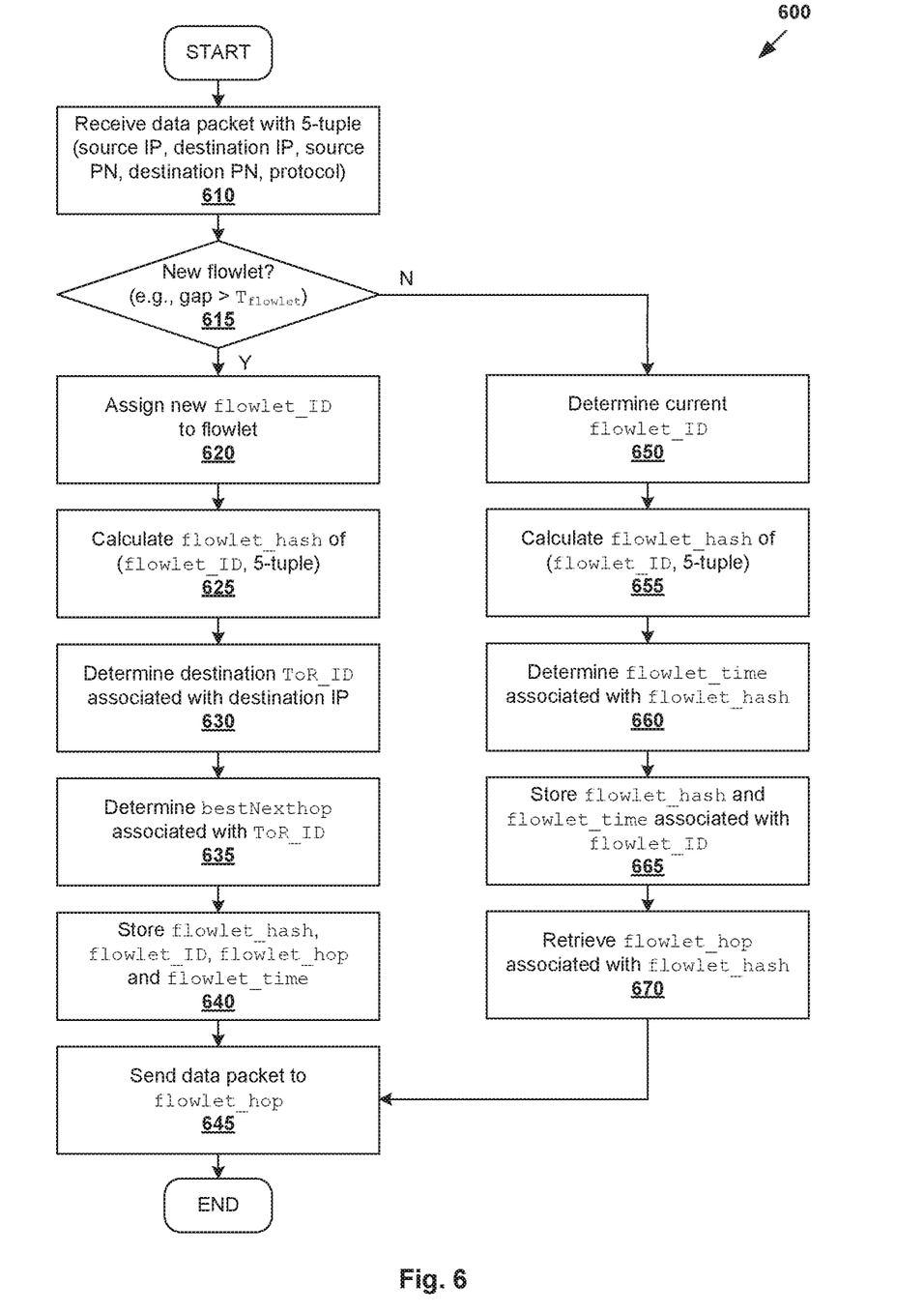
FIG. 6 is a flowchart of an example process for a switch to perform data packet processing in data center network.

FIG. 6 is a flowchart of example process 600 for a switch to perform data packet processing in data center network 500. Example process 600 may include one or more operations, functions, or actions illustrated by one or more blocks, such as 610 to 670. The various blocks may be combined into fewer blocks, divided into additional blocks, and/or eliminated depending on the desired implementation. In the following, example process 600 is performed by "A1" 120 to process and split a flow of data packets 180 into multiple flowlets 510, 520. Example process 600 may be repeated for each and every packet received.

At 610 in FIG. 6, "A1" 120 receives a particular data packet 180 from source ToR switch "T1" 110. For example, data packet 180 is associated with a TCP flow between "EP-A" 102 and "EP-B" 104 and the TCP flow is characterized by five tuples such as source IP address (e.g., IP address of "EP-A" 102), destination IP address (e.g., IP address of "EP-B" 104), source port number (PN), destination PN and protocol (e.g., TCP).

At 615 in FIG. 6, "A1" 120 determines whether data packet 180 belongs to a current flowlet or a new flowlet. For example, the determination may be based on an inter-packet gap between current data packet 180 and a previous packet associated with the same TCP flow (e.g., based on 5-tuple). If data packet 180 is the first packet of the TCP flow, "A1" 120 determines that a new flowlet is detected.

At 620 and 625 in FIG. 6, "A1" 120 assigns a new flowlet_ID (e.g., "F1" 510) to data packet 180 and calculates a hash value (denoted "flowlet_hash") associated with the 5-tuple and the flowlet_ID. Any suitable hash function may be used.

At 630 and 635 in FIG. 6, "A1" 120 determines a destination switch associated with the destination IP address of data packet 180 and the selected next-hop switch for the destination switch. For example in FIG. 5, upon determining that the destination switch is ToR_ID="T2" 160, "A1" 120 may look up switch state information 190 (see FIG. 1 and FIG. 4) to retrieve bestNexthop(ToR_ID)="S1" 130.

At 640 in FIG. 6, "A1" 120 updates flowlet information (see 540 in FIG. 5) to store hash value 542 (e.g., flowlet_hash=H1); flowlet ID 544 (e.g., flowlet_ID="F1" 510); the assigned next-hop switch 546 (e.g., flowlet_hop="S1" 130); and time 548 at which the most recent data packet 180 of the flowlet is received (e.g., flowlet_time=x1). In practice, one or more data structures indexed by flowlet_hash may be used to store the above values.

At 645 in FIG. 6, "A1" 120 sends data packet 180 to "S1" 130, which is the flowlet_hop associated with its flowlet_ID to reach destination switch "T2" 160. Example process 600 may be repeated for each subsequent data packet 180 that follows the initial packet of the same TCP flow.

In a first scenario in which the inter-packet gap is not exceeded, "A1" 120 will assign that subsequent data packet 180 to the same flowlet. In particular, at 650, 655 and 660 in FIG. 6, "A1" 120 determines the current flowlet_ID of the TCP flow, calculates flowlet_hash associated with the 5-tuple and flowlet_ID and determines flowlet_time(flowlet_hash)=current time. At 665 and 670 in FIG. 6, "A1" 120 updates flowlet information 540 to store flowlet_hash and flowlet_time associated with flowlet_ID, and retrieves flowlet_hop(flowlet_hash)="S1" 130 from flowlet information 540. At 645 in FIG. 6, "A1" 120 sends that subsequent data packet 180 to "S1" 130.

In a second scenario in which the inter-packet gap is exceeded, "A1" 120 creates second flowlet "F2" 520 for the TCP flow. In this case, at 620 and 625 in FIG. 6, "A1" 120 assigns flowlet_ID="F2" 520 to subsequent data packet 180 and calculates flowlet_hash associated with the 5-tuple and flowlet_ID. Similarly, at 630 and 635 in FIG. 6, "A1" 120 determines destination switch with ToR_ID="T2" 160 based on the destination IP address and bestNexthop(ToR_ID). In the example in FIG. 5, bestNexthop(ToR_ID) changes from "S1" 130 to "S2" 140 during the inter-packet gap, such as due to a link failure, etc. As such, at 640 in FIG. 6, "A1" 120 updates flowlet information 540 to store flowlet_hash=H2; flowlet_ID="F2" 520; flowlet_hop(flowlet_hash)="S2" 140; and flowlet_time=x2.

Although an example is described using "A1" 120, it should be understood that flowlet detection and path selection may be performed at every hop according to example process 600. Every switch only has the select the best next-hop switch for a flowlet and the forwarding state is already stored as part of switch state information 190 that is periodically updated to reflect the congestion dynamics in the entire network. This way, switches avoid conventional explicit source routing mechanisms.

In practice, probe packets should be sent by ToR switches 110, 160, 405, 406 frequently enough so that other switches receive fine-grained information about the global congestion state. However, the number of probe packets should be moderate enough so that data center network 100/400/500 is not overwhelmed by the probe packets alone. For example, consider a flow scheduled between a pair of ToR switches, the best path information between these ToR switches is used only when a new flowlet is seen in the flow, which occurs at most once every $T_{flowlet}$ seconds. While it is true that flowlets for different flows arrive at different times, any flowlet routing decision is generally made with probe feedback that is stale by at least an RTT. In this case, the congestion state information from probe packets will still be useful for making quick decisions.

Further, a bootstrapping forwarding approach may be used in which the path utilization of all paths to all ToR switches is initialized to a large number (e.g., practically infinite). This gets corrected once the initial set of probe packets are processed by each switch. As such, if no probe packet is received from a certain ToR switch on a certain hop, another hop from which a probe packet is received will be selected. In this case, it is required that the probe packets are processed for discovering routes before sending any data packets.

Scalability, Adaptability and Proactivity

According to examples of the present disclosure, the congestion-aware load balancing approach discussed using FIG. 1 to FIG. 6 is tunnel-free, scalable, proactive and adaptive. Periodic probe packets are used to proactively update switch state information of network switches with the best path information to any given leaf ToR switches. The probe replication process is performed frequently enough to reflect the instantaneous global congestion in the network so that switches are able to make timely and effective forwarding decisions for volatile data center traffic.

Also, unlike traditional routing, fine-grained load balancing may be performed by splitting a flow of packets into multiple flowlets, such as whenever an inter-packet gap is larger than $T_{flowlet}$ seconds (e.g., set in the order of the network RTT) is seen within a flow. This minimizes receiver-side packet reordering when a switch (e.g., "A1" 120) sends different flowlets on different paths that were deemed best at the time of their arrival respectively. Such flowlet switching based on probe-informed forwarding provides the following advantages.

(1) Compact switch state: A switch only maintains switch state information that maps the destination ToR switch (ToR_ID) to the best next-hop switch (bestNexthop) based on associated congestion state (e.g., measured by pathUtil). When the switch receives multiple probe packets coming from different paths to a destination ToR switch, it selects the hop associated with the probe packet with the minimum path utilization. Subsequently, it sends its view of the best path to the destination switch to its neighbors. Thus, even if there are multiple paths to a destination ToR switch, it is not necessary to maintain a per-path congestion state information table for the destination ToR switch. This reduces the size of the table to the order of number of ToRs in the network, as opposed to the number of ToR switches multiplied by the number of paths to each ToR, This effectively removes or at least reduces the likelihood of path explosion on switch memory.

(2) Scalable and adaptive routing: Storing the best-Nexthop in the switch state information eliminates the need for separate source routing in order to exploit multiple network paths. Unlike source-routing schemes, the sender does not bear the burden of selecting optimal paths for data packets. Each switch independently chooses the best next hop to the destination. This has the additional advantage that the switch does not need additional forwarding entries that are necessary for source-routing schemes. The switch memory could instead be more efficiently used to store best next-hop information relating to more destination ToR switches. Since the best next-hop information is updated by probe packets frequently at data plane speeds, data packet forwarding may adapt to data center dynamics (e.g., flow arrivals and departures) more quickly.

(3) Automatic discovery of failures: Each network switch (e.g., "S1" 130) relies on the periodic arrival of probe packets as a keep-alive heartbeat from its neighboring switches. If a switch does not receive a probe packet from a neighboring switch for more than a certain threshold of time, the it ages the associated entries for that hop in the switch state information to ensure that hop is not chosen as the best next-hop switch for any destination ToR switch. Since the switch will pass the information to its neighbors, the information relating to the failed or broken path will reach all the relevant switches within an RTT. Similarly, if the failed link recovers, the next time a probe packet is received on the link, the hop will become a candidate for best next-hop switch to reachable destination ToR switches. This makes for a very fast adaptive forwarding technique that is robust to network topology changes and an attractive alternative to slow control plane assisted routing.

(4) Proactive path discovery: Probe packets are separated from data packets such that the flow of congestion state information is independent of the flow of data packets. This should be contrasted against conventional approaches that rely on data packets to collect congestion state information. Probe packets may be sent on paths that are not yet explored by any switch so that the switches can make instantaneous decision for a new flowlet. This is particularly relevant in the context of large topologies because rotating through several tunnels before finding the optimal uncongested tunnel for a flow can be expensive if many of these tunnels have overlapping bottleneck links that the sender is not aware of. This is primarily because choosing a different path (or tunnel) label at the sender may not necessarily choose a disjoint path. Using the probe replication process described herein, switches on paths connected to the bottleneck link are bound to divert the flowlet to a less congested path. This makes sure short flows quickly get diverted to paths with low round trip time.

(5) Topology and transport-oblivious: Examples of the present disclosure are not designed for any specific topology, nor restrict the number of tiers in the network topology, the number of hops and the number of paths between any given pair of ToR switches. However, as the topology becomes larger, the probe overhead may also increase and probe optimization strategies may be used. For example, as discussed using FIG. 3 and FIG. 4, the number of probe packets may be limited depending on the desired implementation. Unlike load balancing schemes that work best with symmetric topologies, asymmetric topology may be handled more effectively (to be discussed further below using experimental results). Incremental deployment is also plausible because load balancing according to examples of the present disclosure may be applied to a subset of switches and/or a subset of network traffic. The implementation is oblivious to the end-host application transport layer and hence no changes is required to the end host TCP stack is required.

From the above, examples of the present disclosure provide a scalable load-balancing scheme that uses periodic packets to distribute congestion state information and mitigates the problem of concentrating per-path congestion information at the sender. Switches may simply use its switch state information (including bestNexthop etc.) to forward packets to its destination switch, thereby eliminating a separate source-routing mechanism. When failures occur, the switch state information may be automatically updated so that broken paths are avoided.

Examples of the present disclosure may be implemented using any suitable switch, such as switch logic of a switch, etc. The switch logic may be hardware logic (e.g., hardware circuitry), programmable logic, a combination thereof, etc. In one example, a first switch (e.g., A1 120) may be configured to perform congestion-aware load balancing in a data center network according to examples in FIG. 1 to FIG. 6. The first switch may include first ports, a second port and switch logic. The first ports are to receive probe packets from multiple next-hop second switches (e.g., S1 130 and S2 140) that connect the first switch with a third switch (e.g., T2 160) via multiple paths, each probe packet identifying the third switch and includes congestion state information associated with one of the multiple paths to the third switch. The second port may be to receive data packets from a fourth switch (e.g., T1 110) that are destined for a destination connected with the third switch.

The switch logic may be configured to perform the following: in response to receiving the probe packets via the first ports, process the congestion state information in each probe packet to select a selected next-hop second switch from the multiple next-hop second switches, wherein the selected next-hop second switch is associated with a least congested path from the first switch to the third switch; and in response to receiving the data packets via the second port, send the data packets to the selected next-hop second switch such that the data packets travel to the third switch along the least congested path.

The techniques introduced above can be implemented, where appropriate, in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), programmable switch architectures, and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for an aggregate switch to perform congestion-aware load balancing in a data center network that includes a source switch and a destination switch, the aggregate switch, and multiple intermediate switches including a first intermediate switch and a second intermediate switch, the method comprising:

receiving a first probe packet from the first intermediate switch that connects the aggregate switch with the destination switch via a first path, wherein the first probe packet identifies the destination switch and includes first congestion state information having a first maximum link utilization level along a path from the first intermediate switch to the destination switch;

selecting the first intermediate switch from the multiple intermediate switches based on the first congestion state information, wherein the multiple intermediate switches connect the aggregate switch with the destination switch via multiple paths;

after having selected the first intermediate switch, receiving a second probe packet from the second intermediate switch that connects the aggregate switch with the destination switch via a second path, wherein the second probe packet identifies the destination switch and includes second congestion state information having a second maximum link utilization level along a path from the second intermediate switch to the destination switch;

comparing the second maximum link utilization level and local congestion state information associated with an ingress port via which the second probe packet is received from the second intermediate switch to generate a first comparison result;

comparing the first comparison result and the first maximum link utilization level to generate a second comparison result;

determining that a least congested path from the aggregate switch to the destination switch includes the second intermediate switch based on the second comparison result;

updating switch state information with the second intermediate switch and path utilization information associated with the destination switch;

determining whether to send a third probe packet to the source switch, wherein the third probe packet identifies the destination switch and the path utilization information in the switch state information; and in response to receiving data packets from a source endpoint connected via the source switch that are destined for a destination endpoint connected via the destination switch, sending the data packets to the second intermediate switch such that the data packets travel to the destination switch along the least congested path.

2. The method of claim 1, wherein the determining that a least congested path from the aggregate switch to the destination switch includes the second intermediate switch is based on a time elapsed since the first intermediate switch was selected for the destination switch exceeds a predetermined threshold.

3. The method of claim 1, wherein the method further comprises:

determining to send the third probe packet to the source switch based on a time elapsed since the aggregate switch sends a previous probe packet associated with the destination switch exceeds a predetermined threshold.

4. The method of claim 1, wherein sending the data packets comprises:
assigning each of the data packets, being a current data packet, to a new flowlet or current flowlet based on an inter-packet gap between the current data packet and a previous data packet associated with a same communication flow.

5. The method of claim 4, wherein sending the data packets comprises:
in response to determination that the current data packet is assigned to a new flowlet, storing flowlet information that associates the selected intermediate switch with the new flowlet; otherwise, retrieving the selected intermediate switch associated with the current flowlet.

6. An aggregate switch configured to perform congestion-aware load balancing in a data center network that includes a source switch and a destination switch, the aggregate switch, and multiple intermediate switches including a first intermediate switch and a second intermediate switch, wherein the aggregate switch comprises:
a first port to receive a first probe packet from the first intermediate switch that connects the aggregate switch with the destination switch via a first path, wherein the first probe packet identifies the destination switch and includes first congestion state information having a first maximum link utilization level along a path from the first intermediate switch to the destination switch;
a second port to receive a second probe packet from the second intermediate switch that connects the aggregate switch with the destination switch via a second path, wherein the second probe packet identifies the destination switch and includes second congestion state information having a second maximum link utilization level along a path from the second intermediate switch to the destination switch; and
a third port to receive data packets from a source endpoint connected via the source switch that are destined for a destination endpoint connected via the destination switch, wherein the aggregate switch is configured to:
in response to receiving the first probe packet via the first port, select the first intermediate switch from the multiple intermediate switches based on the first congestion state information, wherein the multiple intermediate switches connect the aggregate switch with the destination switch via multiple paths;
after having selected the first intermediate switch and in response to receiving the second probe packet via the second port, compare the second maximum link utilization level and local congestion state information associated with an ingress port via which the second probe packet is received from the second intermediate switch to generate a first comparison result and compare the first comparison result and the first maximum link utilization level to generate a second comparison result;
determine that a least congested path from the aggregate switch to the destination switch includes the second intermediate switch based on the second comparison result;
update switch state information with the second intermediate switch and path utilization information associated with the destination switch;
determine whether to send a third probe packet to the source switch, wherein the third probe packet identifies the destination switch and the path utilization information in the switch state information; and
in response to receiving the data packets via the third port, send the data packets to the second intermediate switch such that the data packets travel to the destination switch along the least congested path.

7. The aggregate switch of claim 6, wherein the aggregate switch is further configured to determine that a least congested path from the aggregate switch to the destination switch includes the second intermediate switch based on a time elapsed since the first intermediate switch was selected for the destination switch exceeds a predetermined threshold.

8. The aggregate switch of claim 6, wherein the aggregate switch is further configured to:
determine to send the third probe packet to the source switch based on a time elapsed since the aggregate switch sends a previous probe packet associated with the destination switch exceeds a predetermined threshold.

9. The aggregate switch of claim 6, wherein the aggregate switch is further configured to send the data packets by assigning each of the data packets, being a current data packet, to a new flowlet or current flowlet based on an inter-packet gap between the current data packet and a previous data packet associated with a same communication flow.

10. The aggregate switch of claim 9, wherein the aggregate switch is further configured to send the data packets by, in response to determination that the current data packet is assigned to a new flowlet, storing flowlet information that associates the selected intermediate switch with the new flowlet; otherwise, retrieving the selected intermediate switch associated with the current flowlet.

* * * * *